(12) United States Patent
Bagagli et al.

(10) Patent No.: US 9,790,932 B2
(45) Date of Patent: Oct. 17, 2017

(54) TRANSLO-ROTATING ACTUATED ROTARY VALVES FOR RECIPROCATING COMPRESSORS AND RELATED METHODS

(71) Applicants: Riccardo Bagagli, Florence (IT); Leonardo Tognarelli, Florence (IT)

(72) Inventors: Riccardo Bagagli, Florence (IT); Leonardo Tognarelli, Florence (IT)

(73) Assignee: Nuovo Pignone S.P.A., Florence (IT)

( * ) Notice: Subject to any disclaimer, the term of this patent is extended or adjusted under 35 U.S.C. 154(b) by 466 days.

(21) Appl. No.: 14/368,982

(22) PCT Filed: Dec. 17, 2012

(86) PCT No.: PCT/EP2012/075736
§ 371 (c)(1),
(2) Date: Jun. 26, 2014

(87) PCT Pub. No.: WO2013/098107
PCT Pub. Date: Jul. 4, 2013

(65) Prior Publication Data
US 2014/0377111 A1    Dec. 25, 2014

(30) Foreign Application Priority Data

Dec. 27, 2011  (IT) .............................. MI2011A2393

(51) Int. Cl.
*F04B 39/10* (2006.01)
*F04B 7/00* (2006.01)
(Continued)

(52) U.S. Cl.
CPC ............ *F04B 7/0061* (2013.01); *F04B 35/01* (2013.01); *F04B 39/08* (2013.01); *F04B 39/10* (2013.01);
(Continued)

(58) Field of Classification Search
CPC ........ F04B 7/0061; F04B 39/10; F04B 39/14; F04B 35/01; F04B 39/08; F04B 39/102;
(Continued)

(56) References Cited

U.S. PATENT DOCUMENTS

| 4,328,831 A | 5/1982 | Wolff |
| 4,440,382 A | 4/1984 | Pruvot et al. |

(Continued)

FOREIGN PATENT DOCUMENTS

| CN | 101725505 A | 6/2010 |
| CN | 101896720 A | 11/2010 |

(Continued)

OTHER PUBLICATIONS

Unofficial English Translation of Chinese Office Action issued in connection with corresponding CN Application No. 201280064965.6 on Sep. 2, 2015.

(Continued)

*Primary Examiner* — Charles Freay
(74) *Attorney, Agent, or Firm* — GE Global Patent Operation

(57) ABSTRACT

An actuated rotary valves for reciprocating compressors used in oil and gas industry, the valve including a stator with a stator opening, a rotor with a rotor opening, and an actuation mechanism. The actuation mechanism is configured to receive a rotation motion and to actuate the rotor to perform first an axial translation moving away from the stator and then a rotation. The actuation mechanism includes an outer shaft configured to receive the rotation motion, and an inner shaft inside the outer shaft and configured to rotate the rotor. The outer shaft is configured to rotate a predetermined angular displacement while pushing the rotor away from the stator before engaging the inner shaft to rotate together with the rotor.

20 Claims, 8 Drawing Sheets

(51) Int. Cl.
*F04B 35/01* (2006.01)
*F04B 39/08* (2006.01)
*F16K 3/08* (2006.01)
*F16K 3/10* (2006.01)
*F04B 39/14* (2006.01)
*F16K 5/04* (2006.01)

(52) U.S. Cl.
CPC ............ *F04B 39/102* (2013.01); *F04B 39/14* (2013.01); *F16K 3/085* (2013.01); *F16K 3/10* (2013.01); *F16K 5/04* (2013.01); *Y10T 29/49238* (2015.01)

(58) Field of Classification Search
CPC ... F16K 5/04; F16K 3/10; F16K 3/085; Y10T 29/49238
USPC ..... 417/515, 536; 137/625.4, 625.46, 625.17
See application file for complete search history.

(56) References Cited

U.S. PATENT DOCUMENTS

| | | | |
|---|---|---|---|
| 5,842,680 A | 12/1998 | Bustamante et al. | |
| 5,950,576 A * | 9/1999 | Busato | F01P 7/16 123/41.08 |
| 6,598,851 B2 | 7/2003 | Schiavone et al. | |
| 7,500,490 B2 * | 3/2009 | Wagner | B01D 53/0446 137/312 |
| 8,210,498 B2 | 7/2012 | Blanchard et al. | |
| 8,740,183 B2 | 6/2014 | Hauri et al. | |
| 2001/0001477 A1 | 5/2001 | Steinebrunner et al. | |
| 2005/0150558 A1 | 7/2005 | Ozawa et al. | |
| 2010/0086415 A1 | 4/2010 | Spiegl et al. | |

FOREIGN PATENT DOCUMENTS

| | | |
|---|---|---|
| EP | 1985834 A1 | 10/2008 |
| WO | 0133125 A1 | 5/2001 |
| WO | 2009146222 A1 | 12/2009 |

OTHER PUBLICATIONS

Search Report and Written Opinion issued in connection with corresponding IT Application No. MI2011A002393 on Aug. 16, 2012.

International Search Report and Written Opinion issued in connection with corresponding PCT Application No. PCT/EP2012/075736 on May 7, 2013.

* cited by examiner

Section A-A'

Section B-B'

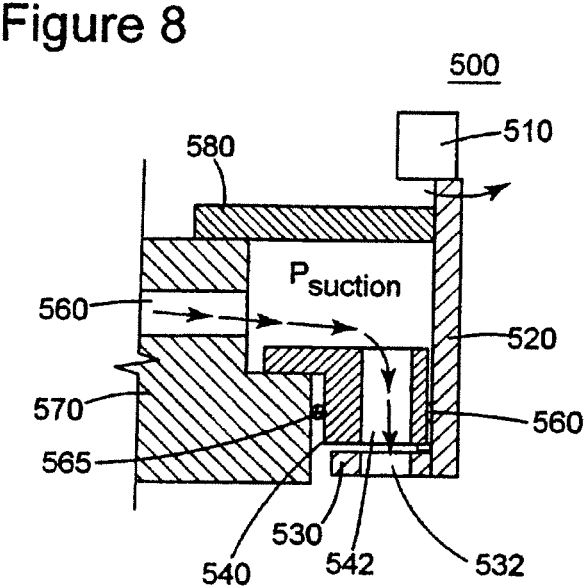
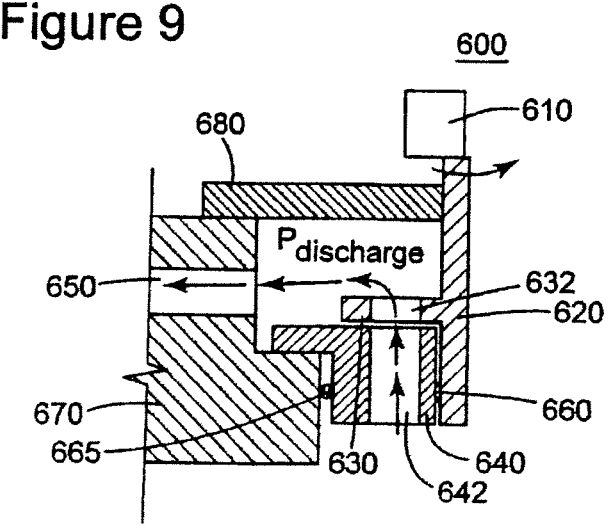

TRANSLO-ROTATING ACTUATED ROTARY VALVES FOR RECIPROCATING COMPRESSORS AND RELATED METHODS

BACKGROUND

Technical Field

Embodiments of the subject matter disclosed herein generally relate to actuated rotary valves useable in reciprocating compressors for oil and gas industry, and, more particularly, to translo-rotating valves that are opened by first translating the valve rotor away from the valve stator, and then rotating the valve rotor around a rotation axis to overlap an opening of the rotor with an opening of the stator in a fluid flow direction.

Discussion of the Background

Compressors used in oil and gas industry, have to meet industry specific requirements that take into consideration, for example, that the compressed fluid is frequently corrosive and flammable. American Petroleum Institute (API), the organization setting the recognized industry standard for equipment used in oil and gas industry has issued a document, API618, listing a complete set of minimum requirements for reciprocating compressors.

The compressors may be classified as positive displacement compressors (e.g., reciprocating, screw, or vane compressors) or dynamic compressors (e.g., centrifugal or axial compressors). In the positive displacement compressors, the gas is compressed by trapping a fixed volume of gas and then reducing that volume. In the dynamic compressors, the gas is compressed by transferring the kinetic energy from a rotating element (such as, an impeller) to the gas to be compressed by the compressor.

FIG. 1 is an illustration of a conventional dual chamber reciprocal compressor 10 used in the oil and gas industry. The fluid compression occurs in a cylinder 20. A fluid to be compressed (e.g., natural gas) is input into the cylinder 20 via an inlet 30, and, after the compression, is output via an outlet 40. The compression is a cyclical process in which the fluid is compressed due to a movement of the piston 50 along the cylinder 20, between a head end 26 and a crank end 28. In fact, the piston 50 divides the cylinder 20 in two compression chambers 22 and 24 operating in different phases of the compression cycle, the volume of compression chamber 22 being at its lowest value when the volume of the compression chamber 24 is at its highest value and vice-versa.

Suction valves 32 and 34 open to allow the fluid that is going to be compressed (i.e., having a first pressure $p_1$) from the inlet 30 into the compression chambers 22 and 24, respectively. Discharge valves 42 and 44 open to allow the fluid that has been compressed (i.e., having a second pressure $p_2$) to be output from the compression chambers 22 and 24, respectively, via the outlet 40. The piston 50 moves due to energy transmitted from a crankshaft 60 via a crosshead 70 and a piston rod 80.

Conventionally, the suction and the compression valves used in a reciprocating compressor are automatic valves that are switched between a close state and an open state due to a differential pressure across the valve. One source of inefficiency in the reciprocating compressor using automatic valves is due to the clearance volume, that is, a volume from which the compressed fluid cannot be evacuated. Rotary valves require less clearance volume than the automatic valves, but operate only if actuated by an external force. Rotary valves are known, for example, they have been described in U.S. Pat. No. 4,328, 831 to Wolff and U.S. Pat. No. 6,598,851 to Schiavone et al.

FIGS. 2A and 2B illustrate a conventional rotary valve 200. The valve includes a stator 210 and a rotor 220. The stator 210 and the rotor 220 are coaxial disks with openings spanning a sector of the same size around a shaft 230. The rotor 210 may be actuated to rotate around the shaft 230 from a first position (FIG. 2A) in which the rotor's opening 212 overlaps the stator's opening 222 to a second position (FIG. 2B) in which the rotor's opening 212 and the stator's opening 222 (shown using dashed line) span different sectors. When the rotor 220 is in the first position, the rotary valve 200 is in the open state allowing a fluid to flow from one side of the rotor stator area to another side of the rotor. When the rotor 220 is in the second position, the rotary valve 200 is in the close state preventing the fluid to flow from one side of the rotor stator area to another side of the rotor.

Rotary valves in reciprocating compressors have not been used for the oil and gas industry because a reliable seal between the stator and the rotor together and the required fast actuation times are not available. Moreover, when actuating the rotor, high friction forces may occur due to (1) the system pressure pushing the rotor towards the stator, and (2) the large friction surface.

Accordingly, it would be desirable to provide systems and methods that avoid the afore-described problems and drawbacks.

SUMMARY

Translo-rotating valves are actuated rotary valves useable in reciprocating compressors for oil and gas industry that achieve both a good sealing while the valves are closed and no friction while the valves are switched to be open, by actuating the rotor to first translate away from the stator and then to rotate overlapping the rotor opening with the stator opening in the fluid flow direction. Using rotary valves in reciprocating compressors has the advantage of an increased passage flow area yielding an increased efficiency of the compressor by enhancing the suction and/or discharge phase.

According to one exemplary embodiment, a rotary valve useable in a reciprocating compressor for oil and gas industry is provided. The rotary valve includes (1) a stator having a stator opening, (2) a rotor having a rotor opening, and (3) an actuation mechanism. The actuation mechanism is configured to receive a rotation motion and to actuate the rotor to perform first an axial translation moving away from the stator and then a rotation. The actuation mechanism includes an outer shaft configured to receive the rotation motion, and an inner shaft inside the outer shaft and configured to rotate the rotor. The outer shaft is configured to rotate a predetermined angular displacement while pushing the rotor away from the stator before engaging the inner shaft to rotate together with the rotor.

According to another exemplary embodiment, a reciprocating compressor for the oil and gas industry includes a compression chamber and at least one rotary valve. The valve includes a stator having a stator opening, a rotor having a rotor opening, and an actuation mechanism. The actuation mechanism is configured to receive a rotation motion and to actuate the rotor to perform first an axial translation moving away from the stator and then a rotation. The actuation mechanism includes an outer shaft configured to receive the rotation motion, and an inner shaft inside the outer shaft and configured to rotate the rotor. The outer shaft is further configured to rotate a predetermined angular displacement while pushing the rotor away from the stator before engaging the inner shaft to rotate together with the rotor.

According to another exemplary embodiment, a method of retrofitting a reciprocating compressor initially having automatic valves is provided. The method includes removing an automatic valve and mounting a rotary valve in a location from which the automatic valve has been removed. The method further includes mounting an actuation mechanism connected to a rotor of the rotary valve and configured to receive a rotation motion to actuate the rotor a rotation motion and to actuate the rotor to perform first an axial translation moving away from a stator of the rotary valve and then a rotation. The actuation mechanism includes an outer shaft configured to receive the rotation motion, and an inner shaft inside the outer shaft and configured to rotate the rotor. The outer shaft is further configured to rotate for a predetermined angular displacement while pushing the rotor away from the stator before engaging the inner shaft to rotate together with the rotor before engaging the inner shaft to rotate together with the rotor.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 8 is a schematic diagram of a rotary valve used as a suction valve of a reciprocating compressor, according to an exemplary embodiment;

FIG. 9 is a schematic diagram of a rotary valve used as a discharge valve of a reciprocating compressor, according to an exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of reciprocating compressors used in oil and gas industry and including rotary valves. However, the embodiments to be discussed next are not limited to this equipment, but may be applied to other equipments.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In some embodiments described below, actuation mechanisms are configured to actuate the rotor of a rotary valve to perform first an axial translation to move the rotor away from the stator, and then a rotation of the rotor. By actuating the rotary valve in this manner lower (or no) friction occurs, and, thus, the actuation timing is better controlled.

Figure 1:
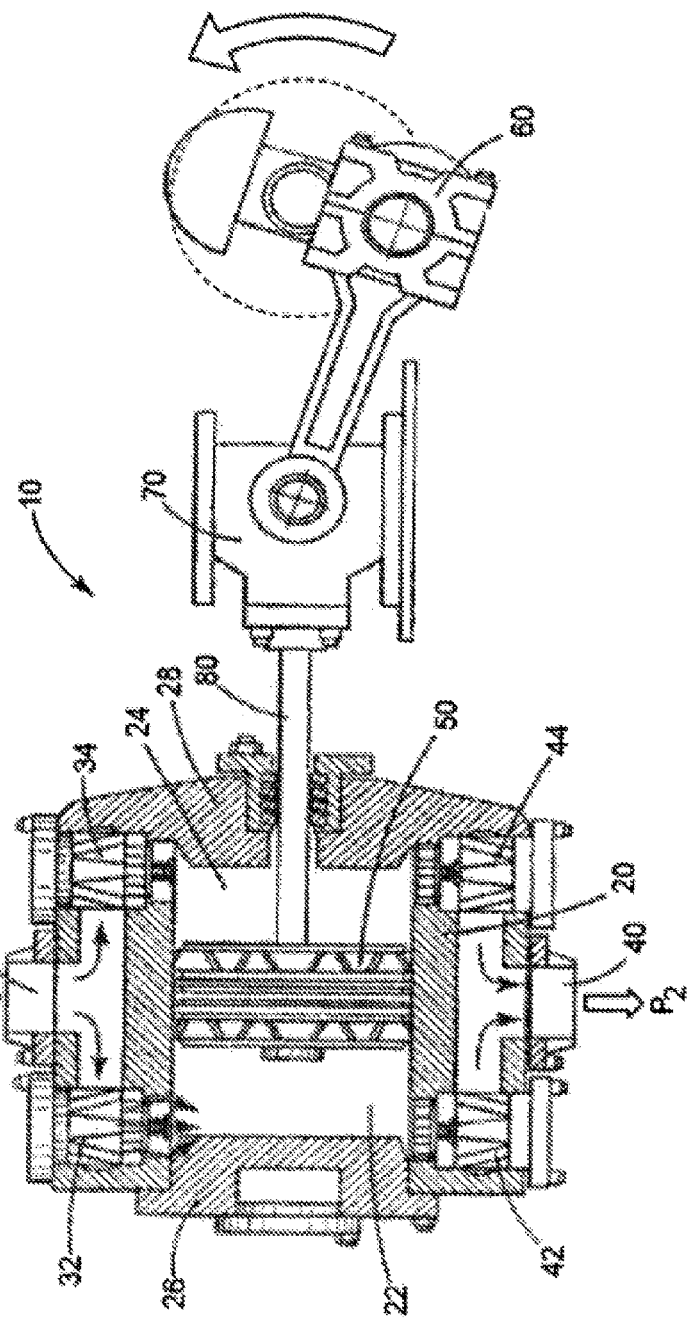
FIG. 1 is a schematic diagram of a conventional dual chamber reciprocating compressor.
Figure 2A:
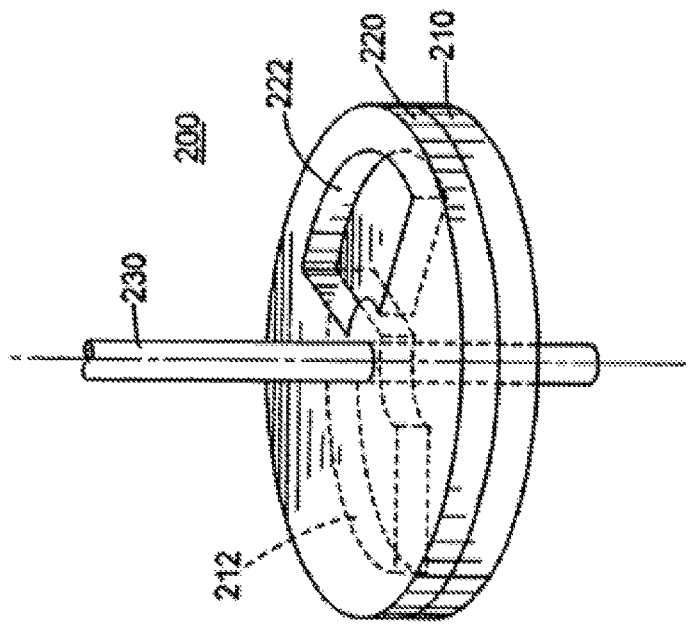
FIGS. 2A and 2B are illustrations of a conventional rotary valve.
Figure 2B:
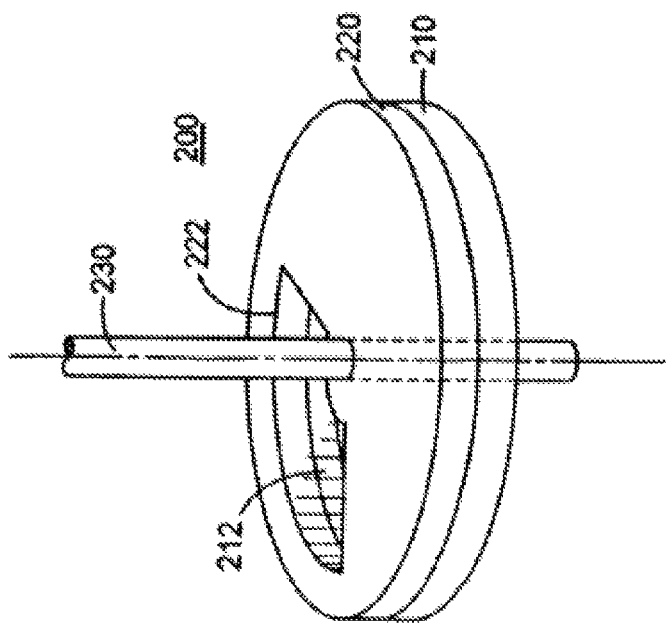
Figure 3:
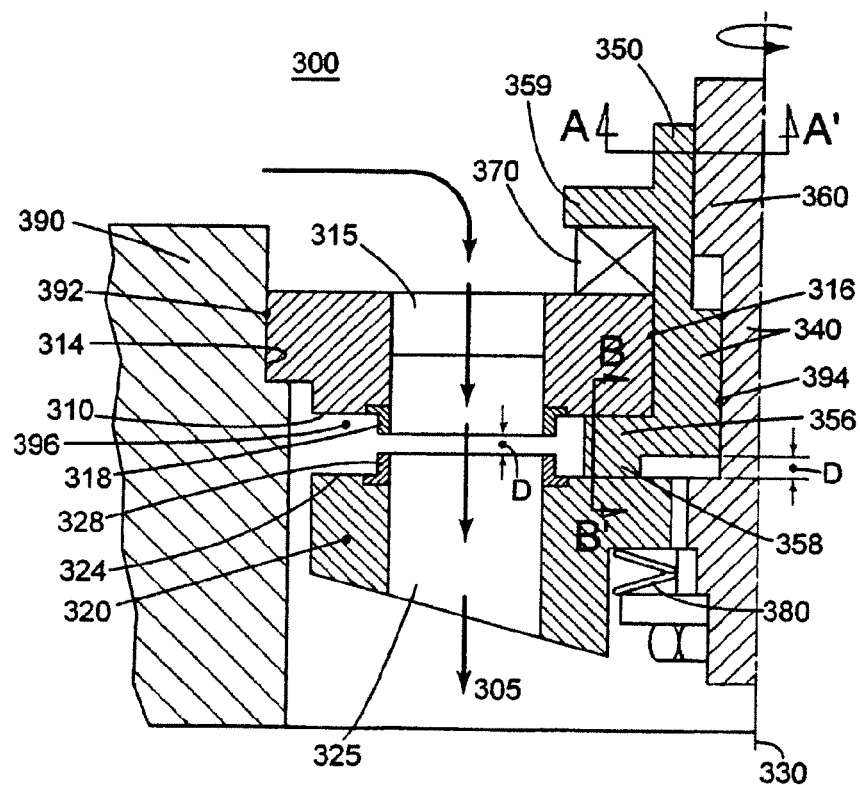
FIG. 3 is a cross-section of a rotary valve, according to an exemplary embodiment.

FIG. 3 is a cross-section of a rotary valve 300, according to an exemplary embodiment. The rotary valve 300 is located between a duct and a compression chamber, the thick arrows 305 representing a fluid passing through the valve 300 when it is open. The valve 300 includes a stator (or "seat") 310 and a rotor 320. The stator 310 has a stator opening 315 allowing the fluid to flow through the valve 300 in the direction of arrow 305, from the duct to the compression chamber. The rotor 320 has a rotor opening 325 allowing the fluid to flow through the valve in the direction of arrow 305. The rotor 320 is configured to be rotated around a rotation axis 330 between a first position in which the rotor opening 325 does not overlap the stator opening 315, and a second position in which the rotor opening 325 overlaps the stator opening 315, as illustrated in FIG. 3.

Figure 4A:
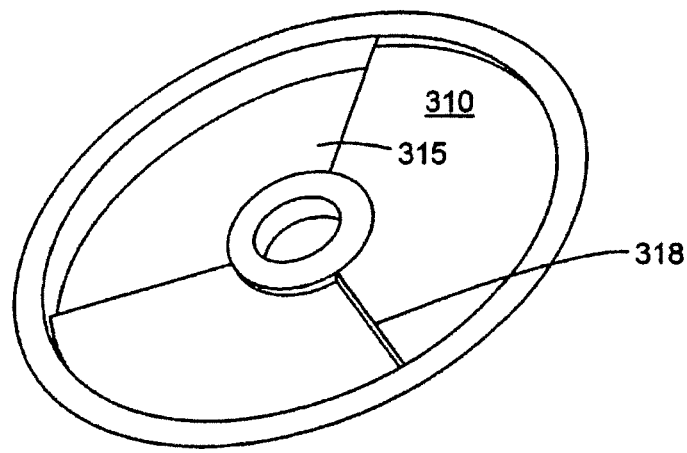
FIGS. 4A and 4B are surface views of a stator and a rotor of a rotary valve having sealing profiles according to exemplary embodiments.
Figure 4B:
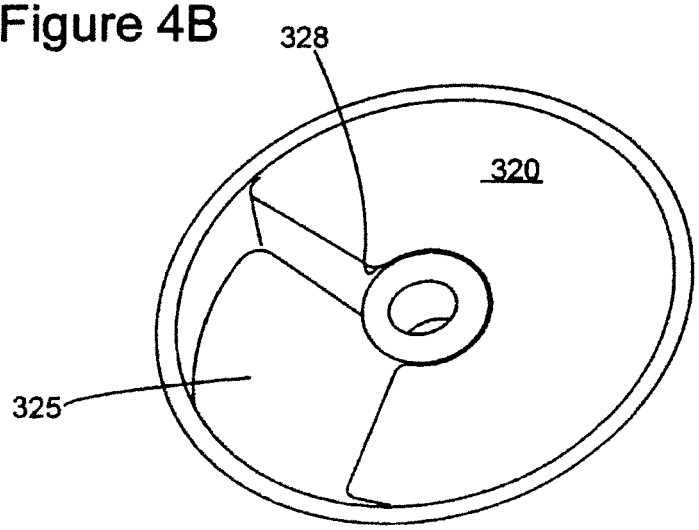

The stator 315 and the rotor 325 may have sealing profiles 318 and 328, respectively that enhance the sealing therebetween. However, presence of these sealing profiles is not required. FIGS. 4A and 4B are surface views of the stator 315 and the rotor 325, respectively, having the sealing profiles 318 and 328 according to exemplary embodiments.

The rotor 320 is actuated by an actuation mechanism 340 configured to receive a rotation motion around the rotation axis 330 from an actuator not shown in FIG. 3. When switching the valve 300 from the closed position to the opened position, the actuation mechanism 340 makes the rotor 320 to perform first a linear motion to move the rotor 320 away from the stator 310 at a distance D, and then a rotation to make the rotor opening 325 to overlap the stator opening 315.

Figure 5:
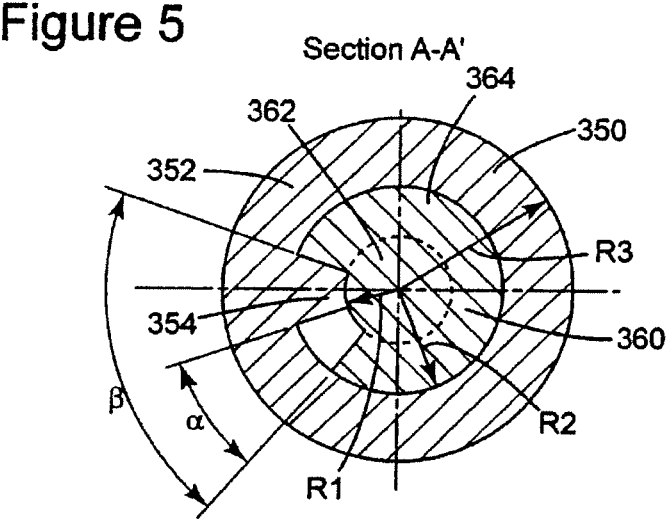
FIG. 5 is a cross-section of an actuation mechanism of a rotary valve according to an exemplary embodiment.

The actuation mechanism 340 includes an outer shaft 350 configured to receive the rotation motion, and an inner shaft 360 located inside the outer shaft 350 and configured to rotate the rotor 320. FIG. 5 is a cross-section A-A' (as marked in FIG. 3) of the actuation mechanism 340, perpendicular to the rotation axis 330. The outer shaft 350 is configured to rotate a predetermined angular displacement α before engaging the inner shaft 360 to rotate together with the rotor 320.

The cross-section of the inner shaft 360 includes a full circle 362 of a radius R1 that is partially surrounded, except for a predetermined angular sector β, by a ring 364 having an outer radius R2 (larger than the radius R1). The predetermined angular sector β is a notch in the outer surface of the inner shaft 360. The cross-section of the outer shaft 350 includes (1) a ring 352 having an inner radius near equal with the radius R2 and an outer radius R3 larger than the radius R2, and (2) a tooth 354 protruding from the ring 352 towards the inner shaft 360, the tooth 354 being configured to move inside the predetermined angular sector β. Thus, the tooth 354 is a portion of a ring similar to the ring 364 and having a tooth angular span equal to the difference between the predetermined angular sector β and the predetermined angular displacement α.

Figure 6:
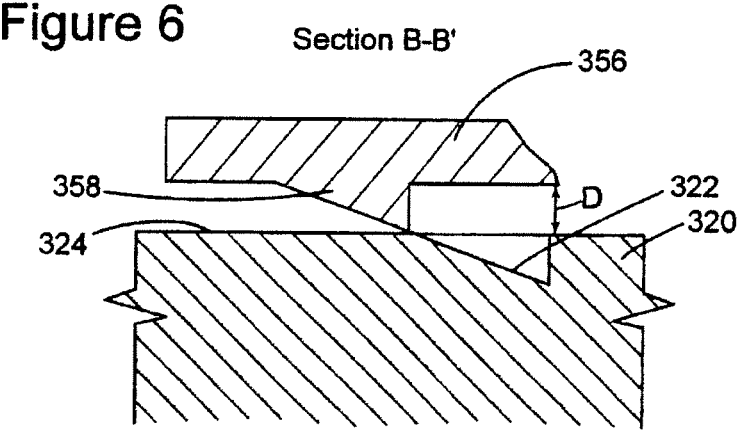
FIG. 6 is another cross-section of a rotary valve according to an exemplary embodiment.

Returning now to FIG. 3, the outer shaft 350 has a portion 356 extending between the rotor 320 and the stator 310, and a profile 358 protruding from the portion 356 towards the rotor 320. Section B-B' illustrated in FIG. 6 facilitates a better understanding of these features. The rotor 320 has a groove 322 on its surface 324, the groove 322 being configured to accommodate the profile 358 of the outer shaft 350. The groove 322 has a depth varying along a path swept by the profile 358 as the outer shaft 350 performs the predetermined angular displacement α before engaging the inner shaft 360. The depth of the groove may vary such as to minimize the friction forces between the groove and the profile, for example, the depth may vary according to a polynomial function. The total depth difference along the path is D.

Returning again to FIG. 3, the outer shaft 350 has a collar 359 located on a side of the stator 310 opposite to the rotor 320. A bushing 370 is located between the collar 359 and the stator 310. A spring 380, which is located under the rotor 320, may bias the rotor 320 towards the stator 310.

The stator 310 is mounted in a passage through a wall 390 of the compression chamber. A seal 392 prevents the fluid from escaping between the wall 390 and the stator 310. Another seal 316 is placed between the stator 310 and the outer shaft 350. Yet another seal 394 is placed between the outer shaft 350 and the inner shaft 360. These seals (392, 316, 394) prevent fluid from leaking between the compression chamber and the duct while the valve 300 is closed. The seals may be O-ring type of seals and may be made of any sutiable material including but not limited to polymers like polyether ether ketone (PEEK) and synthetic fluoropolymers like polytetrafluoroethylene (PTFE).

Near the wall 390, the stator 310 and the rotor 320 are configured to have a space 396 between a surface 314 of the stator 310 and the surface 324 of the rotor 320. The space 396 is in fluid communication with the compression chamber via a fluid pathway between the rotor 320 and the wall 390. The presence of space 396 makes it is easier to perform the axial translation of the rotor 310 as pressure in the space 396 is the same as the pressure in the compression chamber.

Figure 7:
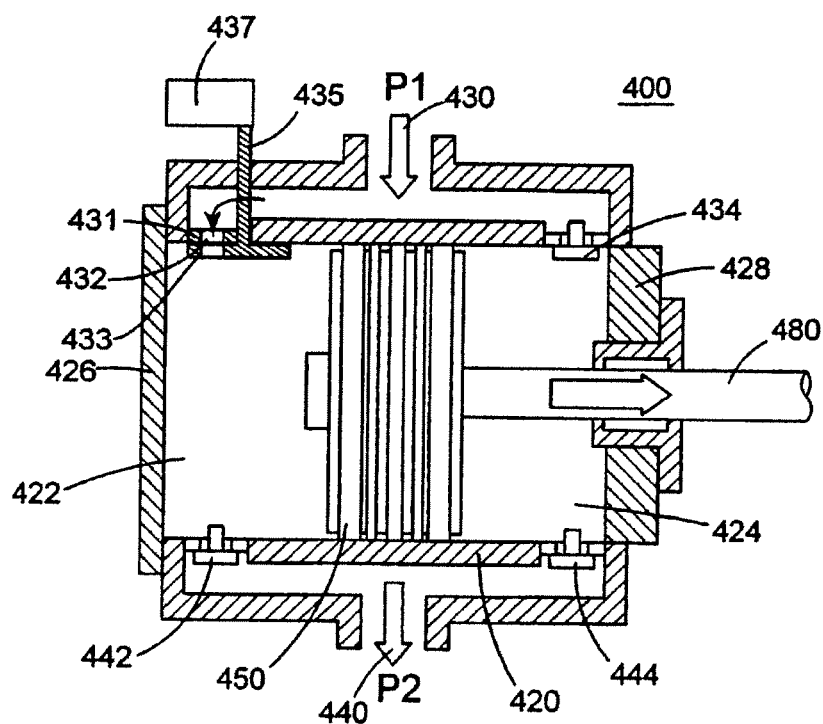
FIG. 7 is a schematic diagram of a compressor including at least one rotary valve according to an exemplary embodiment.

The valve 300 may be used instead of any of the valves of a (single or dual) reciprocating compressor. For example, FIG. 7 illustrates a schematic diagram of a dual reciprocating compressor 400 compressor including at least one rotary valve 432 according to an exemplary embodiment. The compression occurs in a cylinder 420. A fluid to be compressed (e.g., natural gas) is input into the cylinder 420 via an inlet 430, and, after the compression, is output via an outlet 440. The compression occurs due to the back-and-forth movement of the piston 450 along the cylinder 420, between a head end 426 and a crank end 428. The piston 450 divides the cylinder 420 in two compression chambers 422 and 424 operating in different phases of the cyclic compression process, the volume of compression chamber 422 being at its lowest value when the volume of the compression chamber 424 is at its highest value and vice-versa.

Suction valves 432 and 434 open to allow the fluid that is going to be compressed (i.e., having a first pressure $p_1$) from the inlet 430 into the compression chambers 422 and 424, respectively. Discharge valves 442 and 444 open to allow the fluid that has been compressed (i.e., having a second pressure $p_2$) to be output from the compression chambers 422 and 424, respectively, via the outlet 440. The piston 450 moves due to energy received for example from a crankshaft (not shown) via a crosshead (not shown) and a piston rod 480. In FIG. 7, the valves 432, 434, 442, and 444 are illustrated as being located on a lateral wall of the cylinder 420. However, the valves 432 and 442, 434 and 444, may be located on the head end 426 or on the crank end 428 of the cylinder 420, respectively.

An actuated rotary valve 432 opens when an actuator 437 transmits a rotation motion to an actuation mechanism 435 to open the valve 432 by making the rotor 433 to perform first an axial translation moving away from the stator 431 of the valve 432, and then a rotation to have an opening of the rotor 433 overlapping an opening of the stator. One or more valves of the reciprocating compressor 400 may be rotary valves such as the actuated rotary valve 300. A combination of actuated rotary valves and automatic valves may also occur in some embodiments; for example, in one embodiment, the suction valves may be actuated rotary valves such as the valve 300, while the discharge valves may be automatic valves; in another embodiment, the discharge valves may be actuated rotary valves such as valve the 300, while the suction valves may be automatic valves.

FIG. 8 is a schematic diagram of a rotary valve 500 used as a suction valve of a reciprocating compressor, according to an exemplary embodiment. An actuator 510 provides a rotation motion to an actuation mechanism 520, corresponds to the actuation mechanism 340 in FIG. 3. The actuation mechanism 520 is configured to cause the rotor 530 to perform first an axial translation moving away from the stator 540, and then a rotation to overlap the opening 542 of the stator 540 and the opening 532 of the rotor 530 along a flow direction, thereby allowing fluid to flow from a duct 550 inside the compressor chamber. When the valve is closed, the opening 542 of the stator 540 and the opening 532 of the rotor 530 do not overlap thereby preventing the fluid from flowing, the rotor 530 being close to the stator 540 thereby providing a seal between the duct and the compressor.

The rotor 530 is located closer to the compression chamber than the stator 540. A dynamic seal 560 is provided between the stator 540 and the actuation mechanism 520. A seal 565 is provided between the stator 540 and the wall 570 of the compressor chamber. The valve assembly in FIG. 8 may also include a cover 580.

FIG. 9 is a schematic diagram of a rotary valve 600 used as a discharge valve of a reciprocating compressor, according to another exemplary embodiment. An actuator 610 provides a rotation motion to an actuation mechanism 620, which is similar to the actuation mechanism 340 in FIG. 3. The actuation mechanism 620 is configured to cause the rotor 630 of the rotary valve to perform first an axial translation moving away from the stator 640, and then a rotation to overlap the opening 632 of the rotor 630 and the opening 642 of the stator 640 along a flow direction, thereby allowing fluid to flow from a duct 650 inside the compressor chamber. When the valve is closed, the opening 642 of the stator 640 and the opening 632 of the rotor 630 do not overlap thereby preventing the fluid from flowing, the rotor 630 being close to the stator 640 thereby providing a seal between the duct and the compressor.

The rotor 630 is located farther from the compression chamber than the stator 640. A dynamic seal 660 is provided between the stator 640 and the actuation mechanism 620. A seal 665 is provided between the stator 640 and the wall 670 of the compressor chamber. The valve assembly in FIG. 9 may also include a cover 680.

Figure 10:
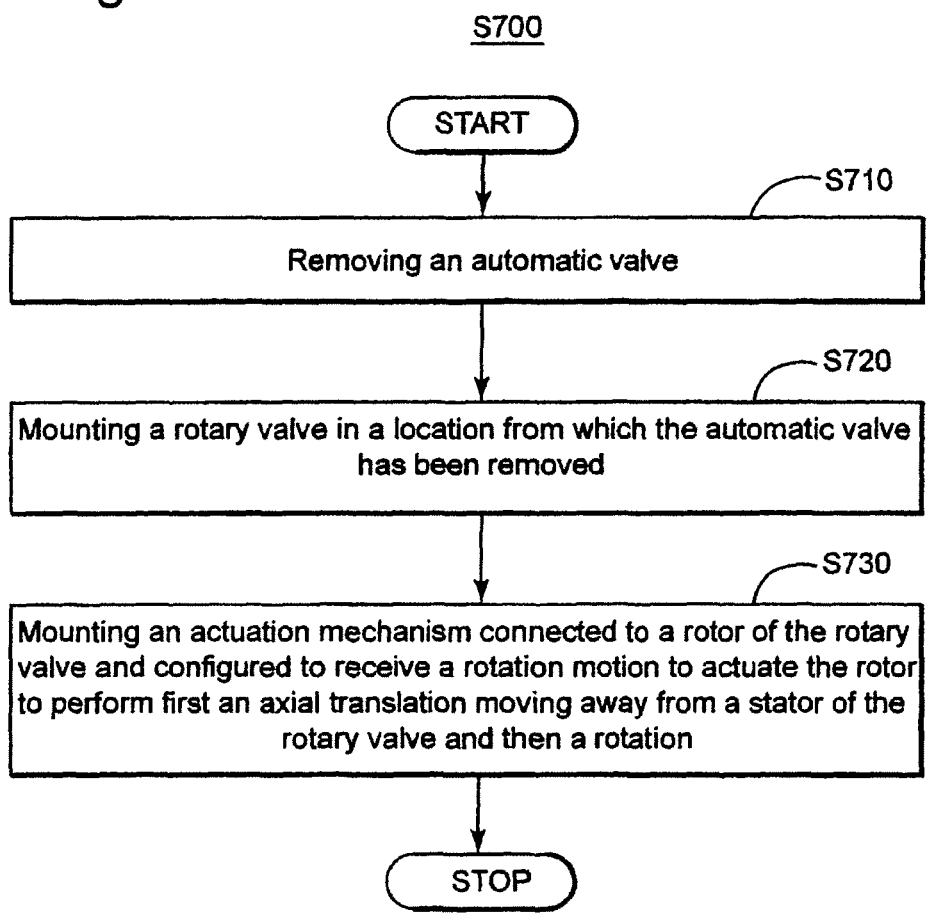
FIG. 10 is a flow chart illustrating steps performed by a method of retrofitting a reciprocating compressor initially having automatic valves, according to an exemplary embodiment.

A reciprocating compressor initially having automatic valves may be retrofitted to include one or more actuated rotary valves such as the valve 300. FIG. 10 is a flow diagram of a method 700 of retrofitting a reciprocating compressor initially having automatic valves. The method 700 includes removing an automatic valve at S710 and mounting a rotary valve in a location from which the automatic valve has been removed at S720. The method 700 further includes mounting an actuation mechanism connected to a rotor of the rotary valve and configured to receive a rotation motion to actuate the rotor to perform first an axial translation moving away from a stator of the rotary valve and then a rotation, at S730. The actuation mechanism includes (1) an outer shaft configured to receive the rotation motion, and (2) an inner shaft configured to rotate the rotor, the outer shaft being configured to rotate for a predetermined angular displacement while pushing the rotor away from the stator before engaging the inner shaft to rotate together with the rotor.

Steps S710, S720, and S730 may be applied once for replacing one valve or multiple times, for replacing some or all the valves of a reciprocating compressor.

The disclosed exemplary embodiments provide rotary valves actuated by moving the rotor away from the stator before rotating the rotor, and reciprocating compressors using these of valves. Methods of retrofitting conventional reciprocating compressors are also provided. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A rotary valve useable in a reciprocating compressor for oil and gas industry, the rotary valve comprising:
   a stator comprising a stator opening;
   a rotor comprising a rotor opening; and
   an actuation mechanism configured to receive a rotation motion and to actuate the rotor to perform first a translation moving away from the stator and then a rotation, the actuation mechanism comprising:
      an outer shaft configured to receive a rotation motion; and
      an inner shaft located inside the outer shaft and configured to rotate the rotor,
      wherein the outer shaft rotates a predetermined angular displacement while pushing the rotor away from the stator, before engaging the inner shaft to rotate together with the rotor, wherein the engagement between the inner shaft and the outer shaft is between a protrusion and a notch.

2. The rotary valve of claim 1, wherein:
   a first cross-section of the inner shaft comprises a circle of a first radius partially surrounded, except for a predetermined angular sector, by a first ring having a second outer radius larger than the first radius, and
   a second cross-section of the outer shaft comprises a second ring having an inner radius substantially equal with the second outer radius and a third outer radius larger than the second outer radius, and a tooth protruding from the second ring towards the inner shaft, the tooth being configured to move inside the predetermined angular sector,
   wherein the first cross-section and the second cross-section are substantially perpendicular to the rotation axis.

3. The rotary valve of claim 2, wherein the tooth is a portion of a ring similar to the first ring and has a tooth angular span smaller than the predetermined angular sector.

4. The rotary valve of claim 1, wherein:
   the outer shaft comprises a portion extending between the rotor and the stator, and a protrusion having a profile extending from the portion towards the rotor, and
   the rotor further comprises a groove on a surface towards the stator, the groove being configured to accommodate the profile, the groove having a depth in the surface varying along a path swept by the protrusion as the outer shaft rotates the predetermined angular displacement before engaging the inner shaft.

5. The rotary valve of claim 4, wherein the depth varies according to a polynomial function.

6. The rotary valve of claim 1, wherein the outer shaft comprises a collar located on a side of the stator opposite to the rotor, and the actuation mechanism further comprises a bushing between the collar and the stator.

7. The rotary valve of claim 1, wherein the stator and the rotor are configured to have a space between a surface of the stator towards the rotor and a surface of the rotor towards the stator in communication with the compression chamber.

8. The rotary valve of claim 1, further comprising:
   a first seal located between the stator and a wall of the compression chamber;
   a second seal located between the outer shaft and the stator; and
   a third seal located between the outer shaft and the inner shaft.

9. A reciprocating compressor for the oil and gas industry, the reciprocating compressor comprising:
   a compression chamber; and
   at least one rotary valve comprising:
      a stator comprising a stator opening;
      a rotor comprising a rotor opening; and
      an actuation mechanism configured to receive a rotation motion and to actuate the rotor to perform first an axial translation moving away from the stator and then a rotation, the actuation mechanism comprising:
         an outer shaft configured to receive the rotation motion; and
         an inner shaft inside the outer shaft and configured to rotate the rotor,
         wherein the outer shaft is further configured to rotate a predetermined angular displacement while pushing the rotor away from the stator before engaging the inner shaft to rotate together with the rotor, wherein the engagement between the inner shaft and the outer shaft is between a protrusion and a notch.

10. The reciprocating compressor of claim 9, wherein:
a first cross-section of the inner shaft comprises a circle of a first radius partially surrounded, except for a predetermined angular sector, by a first ring having a second outer radius larger than the first radius, and
a second cross-section of the outer shaft comprises a second ring having an inner radius substantially equal with the second outer radius and a third outer radius larger than the second outer radius, and a tooth protruding from the second ring towards the inner shaft, the tooth being configured to move inside the predetermined angular sector,
wherein the first cross-section and the second cross-section are substantially perpendicular to the rotation axis.

11. The reciprocating compressor of claim 10, wherein the tooth is a portion of a ring similar to the first ring and has a tooth angular span smaller than the predetermined angular sector.

12. The reciprocating compressor of claim 9, wherein:
the outer shaft comprises a portion extending between the rotor and the stator, and a protrusion having a profile extending from the portion towards the rotor, and
the rotor further comprises a groove on a surface towards the stator, the groove being configured to accommodate the profile, the groove having a depth in the surface varying along a path swept by the protrusion as the outer shaft rotates the predetermined angular displacement before engaging the inner shaft.

13. The reciprocating compressor of claim 12, wherein the depth varies according to a polynomial function.

14. The reciprocating compressor claim 9, wherein the outer shaft comprises a collar located on a side of the stator opposite to the rotor, and the actuation mechanism further comprises a bushing between the collar and the stator.

15. The reciprocating compressor of claim 9, wherein the stator and the rotor are configured to have a space between a surface of the stator towards the rotor and a surface of the rotor towards the stator in communication with the compression chamber.

16. The reciprocating compressor of claim 9, further comprising:
a first seal located between the stator and a wall of the compression chamber;
a second seal located between the outer shaft and the stator; and
a third seal located between the outer shaft and the inner shaft.

17. A method of retrofitting a reciprocating compressor initially having automatic valves, the method comprising:
removing an automatic valve;
mounting a rotary valve in a location from which the automatic valve has been removed; and
mounting an actuation mechanism connected to a rotor of the rotary valve, wherein the actuation mechanism is configured to receive a rotation motion to actuate the rotor to perform first an axial translation moving away from a stator of the rotary valve and then a rotation, the actuation mechanism comprising:
an outer shaft configured to receive the rotation motion, and
an inner shaft inside the outer shaft and configured to rotate the rotor,
wherein the outer shaft is configured to rotate for a predetermined angular displacement while pushing the rotor away from the stator before engaging the inner shaft to rotate together with the rotor, wherein the engagement between the inner shaft and the outer shaft is between a protrusion and a notch.

18. The method of claim 17, wherein:
a first cross-section of the inner shaft comprises a circle of a first radius partially surrounded, except for a predetermined angular sector, by a first ring having a second outer radius larger than the first radius, and
a second cross-section of the outer shaft comprises a second ring having an inner radius substantially equal with the second outer radius and a third outer radius larger than the second outer radius, and a tooth protruding from the second ring towards the inner shaft, the tooth being configured to move inside the predetermined angular sector,
wherein the first cross-section and the second cross-section are substantially perpendicular to the rotation axis.

19. The method of claim 18, wherein the tooth is a portion of a ring similar to the first ring and has a tooth angular span smaller than the predetermined angular sector.

20. The method of claim 17, wherein:
the outer shaft comprises a portion extending between the rotor and the stator, and a protrusion having a profile extending from the portion towards the rotor, and
the rotor further comprises a groove on a surface towards the stator, the groove being configured to accommodate the profile, the groove having a depth in the surface varying along a path swept by the protrusion as the outer shaft rotates the predetermined angular displacement before engaging the inner shaft.

* * * * *